(12) United States Patent
Bouvet

(10) Patent No.: US 12,063,215 B2
(45) Date of Patent: Aug. 13, 2024

(54) METHOD FOR CONFIGURING ACCESS TO AN INTERNET SERVICE

(71) Applicant: ORANGE, Issy-les-Moulineaux (FR)

(72) Inventor: Bertrand Bouvet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 153 days.

(21) Appl. No.: 17/091,450

(22) Filed: Nov. 6, 2020

(65) Prior Publication Data

US 2021/0144139 A1 May 13, 2021

(30) Foreign Application Priority Data

Nov. 8, 2019 (FR) ........................................ 1912555

(51) Int. Cl.
*H04L 9/40* (2022.01)
(52) U.S. Cl.
CPC ........ *H04L 63/0876* (2013.01); *H04L 63/101* (2013.01); *H04L 63/102* (2013.01)
(58) Field of Classification Search
CPC .. H04L 63/0876; H04L 63/101; H04L 63/102
See application file for complete search history.

(56) References Cited

U.S. PATENT DOCUMENTS

| | | | | |
|---|---|---|---|---|
| 6,874,084 | B1 * | 3/2005 | Dobner | H04L 63/168 |
| | | | | 709/223 |
| 10,552,823 | B1 * | 2/2020 | Woodward | G06Q 20/322 |
| 10,999,734 | B1 * | 5/2021 | Alexander | H04L 63/0876 |
| 2008/0052771 | A1 | 2/2008 | Delmond et al. | |
| 2011/0173277 | A1 * | 7/2011 | Cordani | H04W 12/06 |
| | | | | 709/206 |
| 2019/0082323 | A1 * | 3/2019 | Pitti | H04L 63/101 |
| 2019/0364030 | A1 | 11/2019 | Bornecque | |
| 2020/0099682 | A1 * | 3/2020 | Alexander | H04L 63/105 |
| 2021/0120010 | A1 * | 4/2021 | Chen | H04L 67/146 |
| 2021/0144139 | A1 * | 5/2021 | Bouvet | H04L 63/102 |
| 2021/0352478 | A1 * | 11/2021 | Hauser | H04W 12/068 |

FOREIGN PATENT DOCUMENTS

| | | |
|---|---|---|
| FR | 2872363 A1 | 12/2005 |
| FR | 3061971 A1 | 7/2018 |

OTHER PUBLICATIONS

English translation of the French Search Report and Written Opinion dated Jul. 10, 2020 for corresponding French Application No. 1912555, filed on Nov. 8, 2019.

\* cited by examiner

*Primary Examiner* — Harris C Wang
(74) *Attorney, Agent, or Firm* — David D. Brush; Westman, Champlin & Koehler, P.A.

(57) ABSTRACT

A method for configuring access to an Internet service, the method being implemented by a server known as a web server following at least one successful authentication request by a user to access the service, the at least one authentication request being initiated by a terminal of the user. The method includes: a first step of obtaining at least one identifier of the terminal and at least one authentication datum that are present in the at least one authentication request; a second step of obtaining, on the basis of the at least one obtained authentication datum, at least one identifier of the user; a third step of obtaining, on the basis of the at least one identifier of the user and of the at least one identifier of the terminal, at least one access parameter; and a step of configuring the service for the user on the basis of the at least one access parameter.

12 Claims, 2 Drawing Sheets

METHOD FOR CONFIGURING ACCESS TO AN INTERNET SERVICE

1. FIELD OF THE INVENTION

Figure 1:
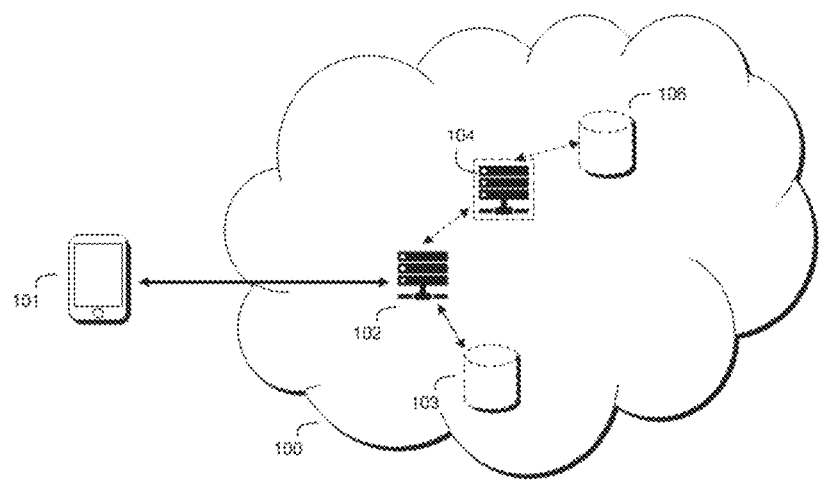

The invention applies to Internet services for which it is necessary to identify and authenticate the user before said user can access said services, such as, for example, a web portal provided by telecommunication operators, banks or administrative bodies, or more generally any website providing Internet services to users.

2. PRIOR ART

A user generally accesses a secure web/Internet service by entering, via a form that is present on the site of the Internet service, an identifier and an associated password, thus allowing the user to be identified (on the basis of the entered identifier) and authenticated (on the basis of the entered password). The identifier may be based on a public identifier such as, for example, an email address, a landline/mobile telephone number, or else an identifier of any kind composed, for example, of a sequence of digits, or a sequence of characters, or of a sequence of digits and of characters.

When the user submits the form, their identifier and associated password are then searched for within a database, for example, in order to check whether they have access rights. If the identifier is not found, then an error message inviting the user to re-enter a login is displayed to the user. This operation is generally authorized several times before the system locks. If the identifier is found in the database, then the password or, more precisely, the hash (digital fingerprint which serves to quickly identify an initial datum and is formed using a function that takes the datum as input) thereof is compared with that stored with the identifier in the database. For security reasons, the password is never stored in plaintext in the database; it is the hash thereof that is stored. For this reason, if the user no longer remembers their password, the system asks the user to create a new one. If the password is correct, then the user is granted access to the service. If not, the system asks for the password to be re-entered, here too with a limit as to the number of possible attempts before the system locks. Unfortunately, it is rather easy for a fraudster to obtain the identifier and the password of a user, for example by using the phishing method.

Moreover, in order to simplify the customer experience for users, when a first identification/authentication is successful, a mechanism managed by the IDMP (IDentity Management Platform) allows a session cookie (file), which is recorded in the non-volatile memory of the terminal of the user, to be generated. This session cookie allows the user to avoid always having to enter their identifier and their password in order to access their services. This is because the cookie allows the web server to recognize the user from one web page to the next. Although this way of operating has advantages in terms of user experience, it also has disadvantages in terms of security. This is because the terminal or the session cookie stored on the terminal may be stolen.

Once the fraudster has the identifier and password pair of the user or the session cookie stored on the terminal, they have complete freedom to act in place of the user or collect sensitive information such as bank details, contacts, documents, etc., with consequences whose severity depends on the type of service, such as, for example, changing the password. The rightful user then no longer has access to the service and cannot change the contact information. The most commonly used techniques/solutions for avoiding/limiting risks are then circumvented. This is because notification messages, a code (for example of 3D secure type) or mail that are sent are then redirected to the terminal of the fraudster or their mailbox.

3. SUMMARY OF THE INVENTION

The invention improves on the prior art and proposes a method for configuring access to an Internet service, said method being implemented by a server known as a web server following at least one successful authentication request by a user to access said service, said at least one authentication request being initiated by a terminal of said user, characterized in that the method comprises:
  a first step of obtaining at least one identifier of said terminal and at least one authentication datum that are present in said at least one authentication request;
  a second step of obtaining, on the basis of said at least one obtained authentication datum, at least one identifier of said user;
  a third step of obtaining, on the basis of said at least one identifier of said user and of said at least one identifier of said terminal, at least one access parameter;
  a step of configuring said service for said user on the basis of said at least one access parameter.

Advantageously, when a user successfully authenticates themselves to an Internet service, the method according to the invention allows for additional verification, for example at the server that executes the Internet service, of the identity of the user in order to reduce fraud. Indeed, access to web services mostly operates in "user-centric" mode, meaning that access to these services is based solely on the validity of an identifier and password of the user (or the session cookie) without further checks. This method according to the invention allows an additional check to be added and makes it possible to ensure that the user is indeed who they claim to be and therefore that the identifier and password of the user (or the session cookie) have not been spoofed.

If a customer/user of a telecommunication operator wishes to authenticate themselves with a web service operated by their telecommunication operator, the method, in the first two steps, will obtain an identifier of the terminal and an identifier of the user. These two identifiers are then compared with the identifiers of the user that are assigned and/or declared in the information system of the operator that manages the Internet access. On the basis of the received access parameter, an access policy for the Internet service is applied for the user by configuration.

In the specific field of banking, European regulations have evolved with the Payment Services Directive 2 (PSD2), which, since September 2019, requires the use of at least two authentication mechanisms from among three main authentication categories in order for a user to be able to access online banking services. The method may advantageously enhance the authentication solutions based on possession (for example a terminal having a certified IP address). The method further proposes implicit authentication which may not require intervention by the user, with an unaltered user process.

An Internet service is understood to mean a service that is provided by a service provider and is accessible via the Internet. This service may, for example, be accessible via a web page, a website, or else via an application with a web view. This also includes services that are voice-accessible, for example via voice assistants.

An authentication request is understood to mean any request allowing a user to authenticate themselves with an Internet service in order to be able to access the various functionalities offered by the service.

An authentication datum is understood to mean any information present in the authentication request allowing the user to authenticate themselves with the Internet service, such as, for example, an identifier and password pair, a session cookie, a MAC address, an IP address, or a biometric datum, such as, for example, voice recognition.

An access parameter is understood to mean a parameter that will allow a user to access all or some of the functionalities of an Internet service. The parameter thus allows access to the functionalities of an Internet service to be configured for a user.

An identifier is understood to mean a sequence of binary data and/or characters that serves to identify, for example, a user or a terminal, such as, for example, a telephone number, an email address, an IP address, a MAC address, an IMEI, an IMSI, etc. As regards the identifier of a user, this may be a telephone number, a name, an address or any other information allowing the user to be identified, such as a social security number or a character string assigned to the user.

According to one particular mode of implementation of the invention, such a method is characterized in that the third obtaining step comprises the following steps:
  a step of transmitting at least one first message to at least one server known as a trusted server, said message comprising at least said identifier of said terminal and said identifier of said user;
  a step of receiving at least one second message from said trusted server, said message comprising at least one access parameter for access to said service for said user.

Advantageously, this embodiment allows, for example, a web server such as a bank server to delegate the verification of the identifier of the terminal and of the identifier of the user to a server which is operated, for example, by the telecommunication operator of the user. The server of the operator is then regarded as a trusted server since it has certified information allowing the identifier of the terminal and/or the identifier of the user to be verified. On the basis of the received access parameter, an access policy for the Internet service is applied for the user by configuration.

According to a variant of this particular mode of implementation of the invention, such a method is characterized in that the transmitting step is preceded by a step of obtaining an identification of said trusted server.

This mode of implementation of the invention makes it possible, for example, not to need to have static knowledge of the information regarding the trusted server, for example via a configuration file for the service. Since the information and the contact details/addresses can be updated regularly, the method will always have the correct address. In the case of a banking service, the bank server will then be able to have dynamic knowledge of, for example, the IP address or the domain name of the server of the telecommunication operator to contact for a given user. Thus, irrespective of the operator of the user, the bank server will interact with the server of the correct telecommunication operator.

According to a variant of this particular mode of implementation of the invention, a method as has been described above is characterized in that said identification of said trusted server is obtained from a database.

Since the database can be updated regularly, the information that relates to the trusted server and is used by the method can be modified until the method is executed. It should be noted that the database may be of any type and may or may not be hosted on the trusted server.

According to another particular mode of implementation of the invention, such a method is characterized in that said at least one identifier of said terminal comprises an address of said terminal.

This mode of implementation of the invention makes it possible to have an identifier of the terminal of the user without there being any need for the user to perform a specific action. This embodiment is totally transparent from a user experience point of view. The identifier of the terminal may, for example, be a MAC address, an IMEI, an IMSI, an encrypted digital key or the IP address thereof, etc.

According to another particular mode of implementation of the invention, a method such as has been described above is characterized in that said at least one identifier of said user comprises a telephone number and/or an email address and/or a postal address and/or a name of said user.

This mode of implementation of the invention makes it possible, for example, to use the information already provided by the user as an identifier when the user registered with the Internet service.

According to another particular mode of implementation of the invention, such a method is characterized in that said at least one identifier of said user is obtained from a database.

This mode of implementation of the invention makes it possible to have an identifier of the user without there being any need for the user to perform a specific action such as, for example, entering a new identifier via an Internet form. This embodiment is totally transparent from a user experience point of view. Moreover, since the database can be updated regularly, the data of the user that are used by the method can be modified until the method is executed. This also makes it possible to have the most relevant possible comparison result and data. It should be noted that the database may be of any type and may or may not be hosted on the web server.

According to another particular mode of implementation of the invention, such a method is characterized in that said at least one access parameter comprises access rights for said user to a subset of the functionalities provided by said service.

This mode of implementation of the invention makes it possible, for example, to configure access to certain functionalities of a website for a user on the basis of the value of the access parameter. If the parameter is a Boolean, the value 0 may, for example, mean that the user has not been authenticated by the trusted server. The method may then hide certain functionalities of the Internet service that are considered to be sensitive, such as, for example, the human-machine interface that is displayed via a web page of the service and allows the information of a user profile to be modified. This mode of implementation also makes it possible to have, for example, one access parameter per functionality or per web page.

Correlatively, the invention also relates to a method for configuring access to an Internet service, said method being implemented by a server known as a trusted server, characterized in that the method comprises:
  a step of receiving at least one first message from a server known as a web server, said message comprising at least one first identifier of a terminal of a user and at least one identifier of said user;
  a step of obtaining, on the basis of said at least received identifier of said user, a second identifier of said terminal of said user;
  a step of sending a second message to said web server, said second message comprising at least one access parameter, said at least one parameter being dependent on a comparison between the first and the second identifier of said terminal of said user.

The invention also relates to a server, known as a web server, for configuring access to an Internet service, characterized in that said server comprises:
- a module for obtaining, following at least one successful authentication request initiated by a terminal of a user to access said service, at least one identifier of said terminal and at least one authentication datum that are present in said authentication request;
- a second module for obtaining, on the basis of said at least one obtained authentication datum, at least one identifier of said user;
- a third module for obtaining, on the basis of said at least one identifier of said user and of said at least one identifier of said terminal, at least one access parameter;
- a module for configuring said service for said user on the basis of said at least one access parameter.

The invention also relates to a server, known as a trusted server, for configuring access to an Internet service, characterized in that said server comprises:
- a module for receiving at least one first message from a server known as a web server, said message comprising at least one first identifier of a terminal of a user and at least one identifier of said user;
- a module for obtaining, on the basis of said at least received identifier of said user, at least one second identifier of said terminal of said user;
- a module for sending a second message to said web server, said second message comprising at least one access parameter, said at least one parameter being dependent on a comparison between the first and the second identifier of said terminal of said user.

System for configuring access to an Internet service, characterized in that the system comprises:
- at least one terminal of a user, and
- at least one web server as described above, and
- at least one trusted server as described above, the system being characterized in that the terminal and the servers are configured, when said user has successfully authenticated themselves with said web server, to send at least one first message comprising at least one first identifier of said terminal of said user and at least one identifier of said user to said trusted server, said trusted server then obtains, on the basis of said at least one received identifier of said user, at least one second identifier of said terminal and generates, on the basis of the comparison performed between the first and the second identifier of said terminal, at least one access parameter for access to the service, which access parameter is sent via at least one second message to said web server, and, when said at least one access parameter is received by said web server, said web server configures the Internet service on the basis of the received access parameter for said user.

The term "module" may correspond either to a software component or to a hardware component, or to a set of hardware and software components, a software component itself corresponding to one or more computer programs or subroutines or, more generally, to any element of a program capable of implementing a function or a set of functions as described for the modules in question. Likewise, a hardware component corresponds to any element of a hardware assembly capable of implementing a function or a set of functions for the module in question (integrated circuit, chip card, memory card, etc.)

The invention also relates to a computer program including instructions for implementing the above method according to any one of the particular embodiments described above when said program is executed by a processor. The method may be implemented in various ways, in particular in hardwired form or in the form of software. This program may use any programming language and may be in the form of source code, object code or intermediate code between source code and object code, such as in a partially compiled form, or in any other desirable form.

The invention also relates to a computer-readable recording medium or information medium that includes instructions of a computer program as mentioned above. The above-mentioned recording media may be any entity or device capable of storing the program. For example, the medium may include a storage means, such as a ROM, for example a CD ROM or a microelectronic circuit ROM, or else a magnetic recording means, for example a hard disk. Alternatively, the recording media may correspond to a transmissible medium such as an electrical or optical signal, which may be routed via an electrical or optical cable, by radio or by other means. The programs according to the invention may in particular be downloaded from an Internet-type network.

Alternatively, the recording media may correspond to an integrated circuit in which the program is incorporated, the circuit being suitable for executing or for being used in the execution of the method in question.

This device for configuring access to an Internet service and this computer program have features and advantages analogous to those described above in relation to the method for configuring access to an Internet service.

4. LIST OF FIGURES

Figure 2:
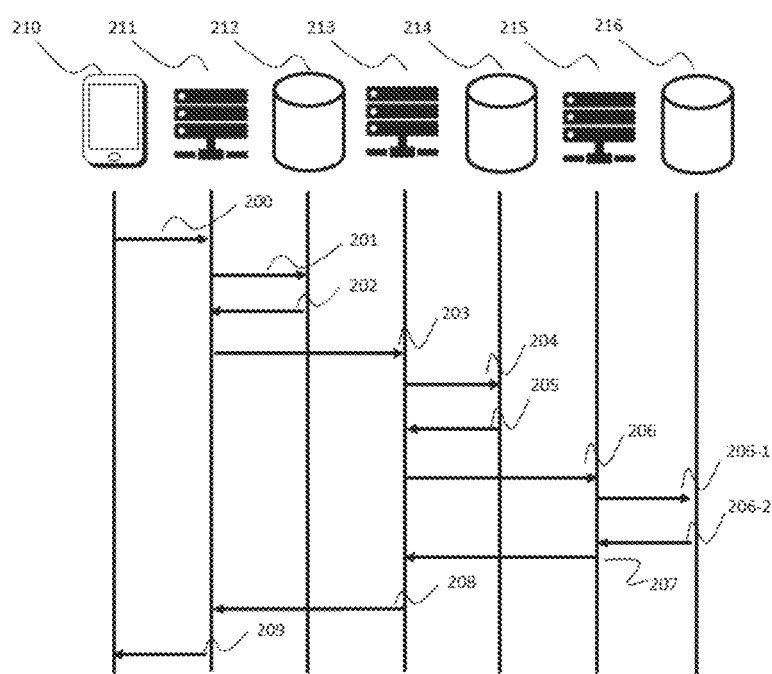
Figure 3:
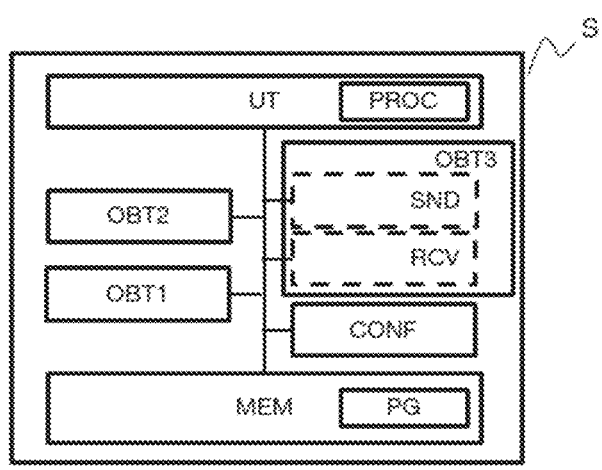

Other features and advantages of the invention will become more clearly apparent on reading the following description of particular embodiments, provided by way of simple illustrative and non-limiting examples, and the appended drawings, in which:

FIG. 1 illustrates an example of an implementation environment according to one particular embodiment of the invention, FIG. 2 illustrates steps of the method for configuring access to an Internet service according to one particular embodiment of the invention, FIG. 3 illustrates the architecture of a device that implements the invention according to one particular embodiment.

5. DESCRIPTION OF ONE EMBODIMENT OF THE INVENTION

FIG. 1 illustrates an example of an environment for implementing the invention according to one particular embodiment of the invention. The implementation environment comprises a terminal 101 such as a mobile telephone, a computer, a smart television, a server, a terminal designed for the Internet of Things or any other terminal capable of establishing communications according to the prior art via a communication network 100 with a server 102. The server 102, which implements the method according to the present invention, is, for example, a web server or any other computing machine for executing and providing web services such as, for example, a website, web pages or any user interface capable of providing content to the user of the terminal 101. The communication network 100 is, for example, an Internet-type network or a private network capable of relaying messages exchanged between the servers and the terminals or any other device present within the communication network 100.

The method may operate permanently and autonomously on the server 102 or following a user action or else during time slots determined by a user. As soon as the method is operational, the method for configuring access to an Internet service begins on the server 102. When the server 102, and, more specifically, an Internet service executed on the server 102, receives, from the terminal 101, an authentication message for a user and the authentication request is valid, then the Internet service will trigger the method for configuring access to an Internet service by sending thereto an identifier of the terminal of the user, known as the first identifier of the terminal, such as, for example, the IP address and/or the MAC address and/or IMEI and/or IMSI received in the message and an authentication datum for the user used during authentication, such as, for example, an identifier and password pair for the service or a session cookie. On the basis of the authentication datum for the user, the method will then obtain a first identifier of the user, which is, for example, retrieved from a database or any other digital storage space in which the information provided by the user when they registered with the Internet service is stored. Concretely, the method may, for example, search in the digital storage space for personal information present in the profile of the user, such as a telephone number, a name, an (email or postal) address or any other information making it possible to identify the user who has been assigned the authentication datum that has allowed successful authentication with the Internet service hosted on the server 102. Once this first identifier of the user has been retrieved, the method will transmit the pair consisting of the first identifier of the terminal of the user and the first identifier of the user to a service, known as an access service, for example of a telecommunication operator, which is capable of knowing certified information relating, for example, to the Internet access of the terminals of the user, such as the IP address assigned to the terminal of the user. The first identifier of the user is then searched for in a digital storage space, such as, for example, a database, of the access service. In the particular case in which the Internet service is an Internet service of a telecommunication operator and that the same server hosts the Internet service and the access service for access to the networks operated by the operator, the entire exchange of messages takes place via messages internal to the server 102. If the first identifier of the user exists within the digital storage space of the access service, then a second identifier of the terminal of the user associated with the first identifier of the user is retrieved from the digital storage space of the access service. The first and the second identifier of the terminal of the user are then compared, and a parameter for configuring access to the Internet service is then generated on the basis of this comparison for the user.

If the comparison is positive, the method may, for example, consider that the user is indeed who they claim to be. The Internet service is then configured for the user on the basis of the access parameter. It should be noted that all the operations of manipulating the identifiers/data of a user or of a user terminal via searches, comparisons and the like may be carried out on all or some of the identifiers/data with or without a prefix/suffix.

If the comparison is negative, the method may, for example, choose to display only some, or none, of the functionalities of the Internet service and to gray out or remove the functionalities of the Internet service that are considered to be sensitive, such as, for example, the modification of the profile of the user with their personal data.

According to one particular embodiment of the invention, the method for configuring access to an Internet service may be triggered by the Internet service only in certain cases, such as, for example, a request for access to sensitive functions of the Internet service such as the modification of the user profile, bank transactions, etc.

According to one particular embodiment of the invention, the method may be executed on a terminal or a server different from the web server, such as, for example, a server that is capable of supporting Internet protocols that require authentication, such as SSH, FTP, etc. before being able to access functionalities that are provided, for example, in "command" mode.

According to one particular embodiment of the invention, in order to determine the access parameter for access to the Internet service for the user, the method may search, within the digital storage space of the access service, for the first identifier of the terminal of the user. If the first identifier of the terminal of the user exists within the digital storage space of the access service, then a second identifier of the user associated with the first identifier of the terminal of the user is retrieved from this same digital storage space. The first and the second identifier of the user are then compared, and a parameter for configuring access to the Internet service is then generated on the basis of this comparison for the user. The Internet service is then configured for the user on the basis of the access parameter. It should be noted that all the operations of manipulating the identifiers/data of a user or of a user terminal via searches, comparisons and the like may be carried out on all or some of the identifiers/data with or without a prefix/suffix.

According to one particular embodiment of the invention, the environment shown in FIG. 1 may also comprise a server 104 (trusted server) and a database 106 accessible from the server 104. This embodiment is, for example, implemented when the Internet service is not hosted on the same server as that of the access service. This is the case, for example, when the website is a bank website that is not operated by the telecommunication operator of the user. The server 102 then transmits the pair consisting of the first identifier of the terminal of the user and the first identifier of the user to the server 104 via, for example, a secure Internet connection or a private network. The server 104, which is, for example, operated by the telecommunication operator, will then interrogate the database 106 and search for the first identifier of the terminal of the user or the first identifier of the user in order and retrieve the associated second identifier of the user or second identifier of the terminal of the user, respectively. The pairs consisting of the first and the second identifier of the user and/or the first and the second identifier of the terminal of the user are then compared, and a parameter for configuring access to the Internet service is then generated on the basis of this comparison for the user. The Internet service is then configured for the user on the basis of the access parameter. It should be noted that all the operations of manipulating the identifiers/data of a user or of a user terminal via searches, comparisons and the like may be carried out on all or some of the identifiers/data with or without a prefix/suffix.

According to one particular embodiment of the invention, the first and the second identifier of the terminal of the user comprise an address of the terminal, such as a MAC address and/or an IP address and/or a concatenation of all or part of a MAC address and of an IP address.

According to one particular embodiment of the invention, the first and the second identifier of the user comprise any information allowing the user to be identified, such as a telephone number and/or an email address and/or a postal address and/or a name of said user and/or a concatenation of all or part of the above-mentioned user identifier examples.

According to one particular embodiment of the invention, the access parameter may correspond to access rights for the user to a subset of the functionalities provided by the Internet service. The access parameter may, for example, be applied for certain sensitive functionalities such as, for example, modifying the user profile, performing bank transactions to external accounts, etc.

According to one particular embodiment of the invention, the method may not itself configure access to the Internet service for a given user. It will then transmit the access parameter to the Internet service and let the Internet service perform the configuration on the basis of the access parameter.

According to one particular embodiment of the invention, the identifier of the server 104 may be obtained from a digital storage space such as, for example, a database. This identifier may be, for example, an IP address or a domain name (FQDN) of the server. This, for example, allows the server 102 to contact the correct trusted server 104 of the telecommunication operator of the user. In another embodiment, the method may systematically interrogate the trusted servers of the various telecommunication operators under consideration (4 in France, for example) and process the various responses, knowing that only one of the consulted telecommunication operators will respond "positively" to the request.

FIG. 2 illustrates steps of the method for configuring access to an Internet service according to one particular embodiment of the invention. The environment for implementing the steps of the method corresponds to that described with reference to FIG. 1, to which a server 213, known as a proxy server, has been added, as has a digital storage space 214 such as a database, known as a portability database.

In step 200, the user terminal 210 sends an authentication request to the web server 211, and more specifically to the web service hosted on the web server 211, for example via an https POST request containing an authentication datum such as, for example, an identifier and password pair or a session cookie of the user. The web service will interrogate the database 212 in step 201 to verify the authentication. If the authentication fails, then the method stops. If not, the service will retrieve (202), from the database 212, an identifier of the user on the basis of the sent authentication datum, such as, for example, the user's name, a (postal or email) address or a telephone number. In the example described here, the identifier of the user is a mobile telephone number.

According to one particular embodiment of the invention, the retrieval of the identifier of the user from the database 212 can take place at the same time as the retrieval of the data for validating the authentication such as, for example, a hash of the password of the user, the retrieved hash then being compared with the hash generated on the basis of the password sent via the authentication request 200 to validate the authentication.

In step 203, the web server/web service to be rendered secure sends, for example, a secure HTTPS request to the URL of the proxy server (213), including as a parameter the value of the identifier of the user, and then the IP address of the terminal of the user, which was retrieved from the source IP address field of the authentication request 200 received by the web server 211. Once the request 203 has been received, the proxy server checks that the web server 211 is indeed authorized to make a request of it. This check can be performed, for example, on the basis of a list of authorized IP addresses, of domain names, of the specific HTTP/HTTPS headers, etc. If the web service is not authorized to make a request of the proxy server, an error code, for example HTTP 403 Forbidden, is returned to the web server 211. Otherwise, the proxy server extracts the identifier of the user (i.e. the mobile telephone number) from the HTTPS request and will, if necessary, modify it to put it in the E.164 international format, and then to put it in the format of an ENUM (Electronic NUMbering) domain name.

In step 204, the proxy server will consult the portability database 214 of the telephone numbers of the user's country via, for example, the ENUM DNS standardized protocol. In return (step 205), the portability database 214 will provide, via, for example, a prefix, the identifier of the telecommunication operator in charge of the telephone number. If no prefix is returned, this may mean that the telephone number is not posted. This means that it has not been transferred to a telecommunication operator other than that which initially provided the number to the user. In this case, all that is needed is to consult the public table of the blocks of telephone numbers allocated by the regulatory authority of the country (such as, for example, ARCEP in France) to identify the telecommunication operator.

In step 206, since the proxy server has the name of the telecommunications operator in charge of the mobile telephone number provided in the received HTTPS request (203), it derives therefrom the address of the server of the telecommunication operator (trusted server) to contact. This derivation can be performed, for example, via a dedicated table which holds a record of the prefixes of the telecommunication operators associated with the IP addresses or domain name (FQDN) of the servers. The proxy server then interrogates (206) the identified server (215) of the telecommunication operator via, for example, a (REST/HTTP) API, providing as a parameter the identifier of the user which is known by the operator (for example the telephone number) and also the IP address of the terminal of the user. It should be noted that this information may be provided in encrypted form in order to render the exchanges between the proxy server 213 and the server 215 of the operator secure.

In step 206-1, the server of the telecommunication operator consults a digital storage space 216 which holds a record of the (fixed and/or mobile) Internet sessions of the operator, such as, for example, a database, providing, as a search key, either the identifier of the user (telephone number) or the identifier of the terminal of the user, such as, for example, the source IP address of the request 200. It should be noted that in the case of an IP address, the server of the telecommunication operator may initially check that this IP address belongs to one of its IP address blocks. If this is not the case, then an error message, for example of HTTP 404 Not Found type, may be sent back to the web server via the proxy server. Otherwise, the server of the telecommunication operator moves on to step 206-1.

In step 206-2, the server of the telecommunication operator receives, from the digital storage space, a response to the request sent in step 206-1. If the identifier of the user does not exist in the digital storage space, then an error message, for example of HTTP 404 Not Found type, may be sent back to the web server via the proxy server. If, however, the identifier of the user does exist, then there are several cases to consider:

the identifier of the terminal of the user (for example the IP address) associated with the identifier of the user does not exist or does not correspond to that present in the request 200; in this case the server of the telecommunication operator sends a message, for example of HTTP 403 Forbidden type, back to the web server via the proxy server, the identifier of the terminal of the user associated with the identifier of the user exists and does indeed correspond to that present in the request 200; in this case, the server of the telecommunication operator returns a message with the code HTTP 200 OK and with content (for example via an XML structure) to the web server via the proxy server.

Depending on the status and content of the message 209, the web server will or will not adapt access to the service, or will or will not display certain functionalities on the website and on a web page returned to the user. Optionally, the content of the message may contain additional information such as, for example, an item of terminal location information (home or roaming, with or without the country information), which allows, for example, the web server to present or not to present some of its high-risk functionalities to the user.

FIG. 3 illustrates a device S configured to implement the method for configuring access to an Internet service according to one particular embodiment of the invention.

According to one particular embodiment of the invention, the device S has the conventional architecture of a server and comprises, in particular, a memory MEM, a processing unit UT, which is provided, for example, with a processor PROC and is controlled by the computer program PG stored in the memory MEM. The computer program PG comprises instructions for implementing the steps of the method for configuring access to an Internet service as described above when the program is executed by the processor PROC.

Upon initialization, the code instructions of the computer program PG are, for example, loaded into a memory before being executed by the processor PROC. The processor PROC of the processing unit UT implements, in particular, the steps of the method for configuring access to an Internet service according to any one of the particular embodiments described in connection with FIGS. 1 and 2 according to the instructions of the computer program PG.

The device S comprises an obtaining module OBT1, which is capable of obtaining at least one identifier of a terminal of a user and at least one authentication datum for a user that are present in an authentication request to an Internet service. The device also comprises a second obtaining module OBT2, which is capable of obtaining, on the basis of an obtained authentication datum, at least one identifier of the user. The device S further comprises a third obtaining module OBT3, which is capable of obtaining, on the basis of an identifier of the user and of an identifier of the terminal of the user, at least one access parameter. The device S further comprises a module CONF which is capable of configuring access to the Internet service for the user on the basis of the obtained access parameter.

According to one particular embodiment of the invention, the obtaining module OBT3 comprises a module SND, which is capable of sending messages/requests, for example, to a server or to a remote database, and a module RCV, which is capable of receiving, for example, the responses to the messages/requests sent by the module SND.

It goes without saying that the embodiment which has been described above has been given purely by way of wholly non-limiting indication and that numerous modifications may easily be made by a person skilled in the art without departing from the scope of the invention.

The invention claimed is:

1. A method comprising:
configuring access to at least one function of an Internet service, said configuring being implemented by a server known as a web server following at least one successful authentication request by a user to access said Internet service and being triggered by the Internet service, the at least one function being able to manage personal data of the user, said at least one authentication request being initiated by a terminal of said user, wherein the configuring comprises:
a first step of obtaining at least one identifier of said terminal and at least one authentication datum that are present in said at least one authentication request;
a second step of obtaining, on the basis of said at least one obtained authentication datum, at least one identifier of said user;
a third step of obtaining, on the basis of a result of a comparison between said at least one identifier of said terminal and at least a second certified identifier of said terminal obtained on the basis of the said at least one identifier of said user from a telecommunication operator server, at least one access parameter, the at least one access parameter comprising access rights for the user to the at least one function of the Internet service; and
a step of configuring said Internet service for said user on the basis of said at least one access parameter.

2. The method according to claim 1, wherein the third obtaining step comprises the following steps:
a step of transmitting at least one first message to at least one server known as a trusted server, said at least one first message comprising at least said identifier of said terminal and said identifier of said user; and
a step of receiving at least one second message from said trusted server, said at least one second message comprising the at least one access parameter.

3. The method according to claim 2, wherein the transmitting step is preceded by a step of obtaining an identification of said trusted server.

4. The method according to claim 3, wherein said identification of said trusted server is obtained from a database.

5. The method according to claim 1, wherein said at least one identifier of said terminal comprises an address of said terminal.

6. The method according to claim 1, wherein said at least one identifier of said user comprises a telephone number and/or an email address and/or a postal address and/or a name of said user.

7. The method according to claim 1, wherein said at least one identifier of said user is obtained from a database.

8. A method comprising:
configuring access to at least one function of an Internet service, said method being implemented by a server of a telecommunication operator, known as a trusted server, wherein the configuring comprises:
a step of receiving at least one first message from a server known as a web server, said at least one first message comprising at least one first identifier of a terminal of a user and at least one identifier of said user, the at least one first message being triggered by the Internet service;
a step of obtaining, on the basis of said at least received identifier of said user, a second certified identifier of said terminal of said user;

a step of obtaining at least one access parameter on the basis of a result of a comparison between said at least one first identifier of the terminal and the second certified identifier of said terminal, and a step of sending a second message to said web server, said second message comprising the at least one access parameter, the at least one access parameter comprising access rights for the user to configure the at least one function of the Internet service, the at least one function being able to manage personal data of the user.

9. A server, known as a web server, for configuring access to at least one function of an Internet service, wherein said server comprises:

a processor; and a non-transitory computer-readable medium comprising instructions stored thereon which when executed by the processor configure the server to:

configure access to the at least one function of the Internet service, the at least one function being able to manage personal data of a user, the configuring comprising:

obtaining, following at least one successful authentication request initiated by a terminal of the user to access said Internet service, at least one identifier of said terminal and at least one authentication datum that are present in said authentication request;

obtaining, on the basis of said at least one obtained authentication datum, at least one identifier of said user;

obtaining, on the basis of a result of a comparison between said at least one identifier of said terminal and at least a second certified identifier of said terminal obtained on the basis of the said at least one identifier of said user from a telecommunication operator server, at least one access parameter, the at least one access parameter comprising access rights for the user to the at least one function of the Internet service; and configuring said Internet service for said user on the basis of said at least one access parameter; and trigger the configuring of the access to the Internet service.

10. A trusted server of a telecommunication operator for configuring access to at least one function of an Internet service, wherein said trusted server comprises:

a processor; and a non-transitory computer-readable medium comprising instructions stored thereon which when executed by the processor configure the trusted server to:

receive at least one first message from a server known as a web server, said at least one first message comprising at least one first identifier of a terminal of a user and at least one identifier of said user, the at least one first message being triggered by the Internet service;

obtain, on the basis of said at least received identifier of said user, at least one second certified identifier of said terminal of said user;

obtain at least one access parameter on the basis of a result of a comparison between said at least one first identifier of the terminal and the second certified identifier of said terminal, and send a second message to said web server, said second message comprising the at least one access parameter, the at least one access parameter comprising access rights for the user to configure the at least one function of the Internet service, the at least one function being able to manage personal data of the user.

11. A non-transitory computer-readable medium comprising a computer program stored thereon and including instructions for implementing a method of configuring access to at least one function of an Internet service when the program is executed by a processor of a web server, wherein the instructions configure the web server to:

configure access to the at least one function of the Internet service, the at least one function being able to manage personal data of the user, and the configuring comprising:

performing, following at least one successful authentication request by the user to access said Internet service, said at least one authentication request being initiated by a terminal of said user;

a first step of obtaining at least one identifier of said terminal and at least one authentication datum that are present in said at least one authentication request;

a second step of obtaining, on the basis of said at least one obtained authentication datum, at least one identifier of said user;

a third step of obtaining, on the basis of a result of a comparison between said at least one identifier of said terminal and at least a second certified identifier of said terminal obtained on the basis of the said at least one identifier of said user from a telecommunication operator server, at least one access parameter, the at least one access parameter comprising access rights for the user to the at least one function of the Internet service; and a step of configuring said Internet service for said user on the basis of said at least one access parameter; and trigger the configuring of the access to the Internet service.

12. A non-transitory computer-readable medium comprising a computer program stored thereon and including instructions for implementing a method of configuring access to at least one function of an Internet service when the program is executed by a processor of a trusted server of a telecommunication operator, wherein the instructions configure the trusted server to:

receive at least one first message from a server known as a web server, said at least one first message comprising at least one first identifier of a terminal of a user and at least one identifier of said user, the at least one first message being triggered by the Internet service;

obtain, on the basis of said at least received identifier of said user, a second certified identifier of said terminal of said user;

obtain at least one access parameter on the basis of a result of a comparison between said at least one first identifier of the terminal and the second certified identifier of said terminal, and send a second message to said web server, said second message comprising the at least one access parameter, the at least one access parameter comprising access rights for the user to configure the at least one function of the Internet service, the at least one function being able to manage personal data of the user.

* * * * *